Aug. 22, 1967 G. VON KULLWITZ ETAL 3,336,622
CLEANING DEVICE FOR MOTOR VEHICLES FOR
THE AUTOMATIC CLEANING OF MOTOR CARS
Filed March 22, 1965 5 Sheets-Sheet 4

INVENTORS
GEORG VON KULLWITZ
HANS LEIDEL
WALTER KISSEL
BY
Morgan, Finnegan, Durham & Pine
ATTORNEYS

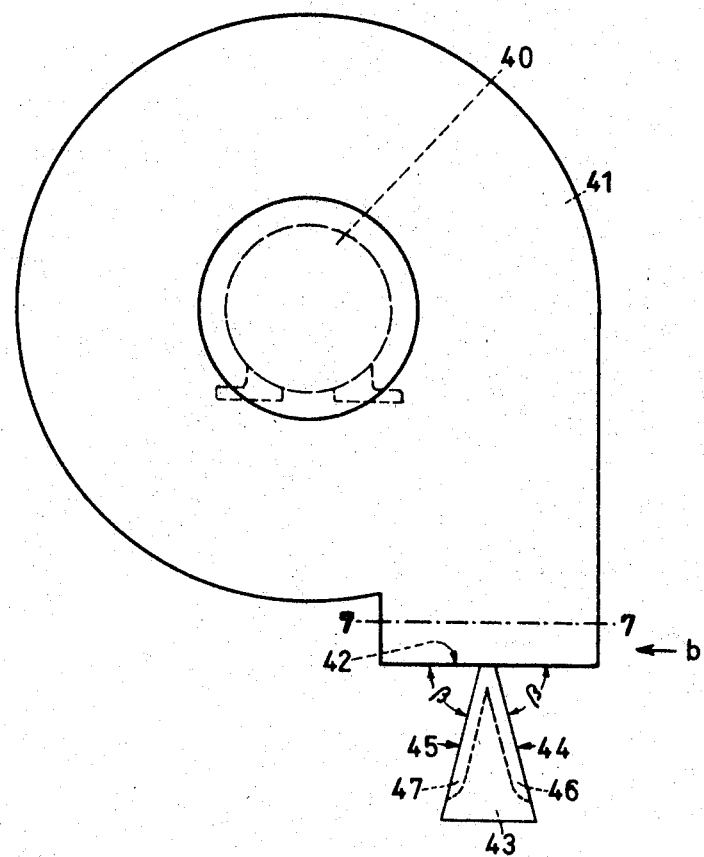
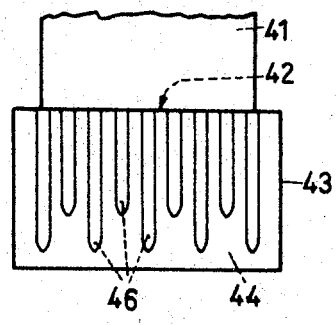

United States Patent Office 3,336,622
Patented Aug. 22, 1967

3,336,622
CLEANING DEVICE FOR MOTOR VEHICLES FOR THE AUTOMATIC CLEANING OF MOTOR CARS
Georg von Kullwitz, Friedenstrasse, Lohr am Main, Germany, and Hans Leidel and Walter Kissel, both of 51 Rue des Peupliers, Luxembourg, Luxembourg
Filed Mar. 22, 1965, Ser. No. 441,444
Claims priority, application Luxembourg, Mar. 20, 1964, 45,709/64
1 Claim. (Cl. 15—302)

The invention relates to a car cleaning plant for the automatic cleaning of motor cars, which comprises a spraying apparatus for spraying the car to be cleaned with a cleansing liquid, a washing and polishing apparatus provided with one rotating cleaning roller or a plurality of cleaning rollers for washing and polishing the motor cars; drying apparatus for drying the motor cars, and control means by which the apparatus referred to is automatically started and stopped.

One known motor-car cleaning plant for the automatic cleaning of motor cars contains a spraying apparatus provided with spray nozzles for spraying motor cars; washing and polishing apparatus provided with one cleaning roller or a plurality of cleaning rollers for washing and polishing the motor cars, and drying apparatus for drying the motor cars. Each cleaning roller has a roller shaft, and, secured to the roller shaft, are a plurality of cleaning discs made of a sponge-like cellular plastic material such as polyurethane foam, the cleaning discs being shaped as a flat ring having a cylindrical peripheral area. This known car-cleaning plant has the disadvantage that the cleaning discs of the individual cleaning rollers have comparatively poor clinging properties, so that the washing and polishing properties thereof are unsuitable for cleaning and polishing perfectly and extremely carefully the smooth surfaces of the motor car and the parts projecting from such surfaces. The disadvantages hereinbefore described are mainly due to the fact that the individual cleaning discs are flexible in a longitudinal sectional plane extending parallel to the roller shaft only, but are not flexible in a cross-sectional plane extending transversely to the roller shaft. An additional disadvantage of the known car-cleaning plant resides in the fact that the drying apparatus has an electrically driven blower which produces a uniformly flowing air current which is blown against the motor car to be dried, so that the drying apparatus is of a comparatively large and heavy construction, requires a substantial amount of electrical energy, and increases the cost of drying motor cars, and necessitates the provision of an electric current supply installation with high wattages or connecting loads. Such installations are generally not available in small car-washing rooms, or cannot be provided therein, so that car-cleaning plants of this kind cannot be installed in the car-washing rooms referred to.

It is an object of the invention to provide a car-cleaning plant for the automatic cleaning of motor cars, in which the disadvantages hereinbefore described are avoided, and by which an automatic, extremely careful and perfect cleaning of motor cars may be obtained.

In accordance with the invention, this object is achieved in that, in a car cleaning plant for the automatic cleaning of motor cars, which contains spraying apparatus for spraying the motor cars to be cleaned with a cleansing liquid, and washing and polishing apparatus provided with one rotating cleaning roll or a plurality of rotating cleaning rolls for washing and polishing the cars, each cleaning roll is provided with a plurality of flexible cleaning bands or flexible cleaning strips made of a flexible, foam-like material, for example an elastic, clinging, cellular plastic material or polyurethane foam, which absorbs and gives off cleansing liquid for washing and polishing, the cleaning bands or cleaning strips being, in dependence upon the number of bands or strips provided, distributed along the length of the roller shaft of the cleaning roll and disposed at intervals around and secured to the roller shaft in such manner that the geometric longitudinal axis of the longitudinal part of the respective cleaning bands or cleaning strips adjacent but not secured to the roller shaft is flexible in an imaginary transverse, or substantially transverse, cross-sectional plane intersecting the roller shaft, and is, moreover, flexible in an imaginary longitudinal sectional plane extending parallel, or substantially parallel, to the roller shaft, the drying apparatus being, for the drying of motor cars, provided with a turbulence producing apparatus which produces whirlwinds or cyclones flowing in various directions which it blows against the surfaces of the motor car to be dried.

One construction according to the invention is diagrammatically illustrated by way of example in the accompanying drawings, in which:

FIGURE 6 is a side elevation of a turbulence producer in which a vertical whirlwind is produced, and FIGURE 7 shows a fractional part of the turbulence producer shown in FIGURE 6 along the line 7—7 in FIGURE 6 viewed in the direction of the arrow $b$.

Figure 1:
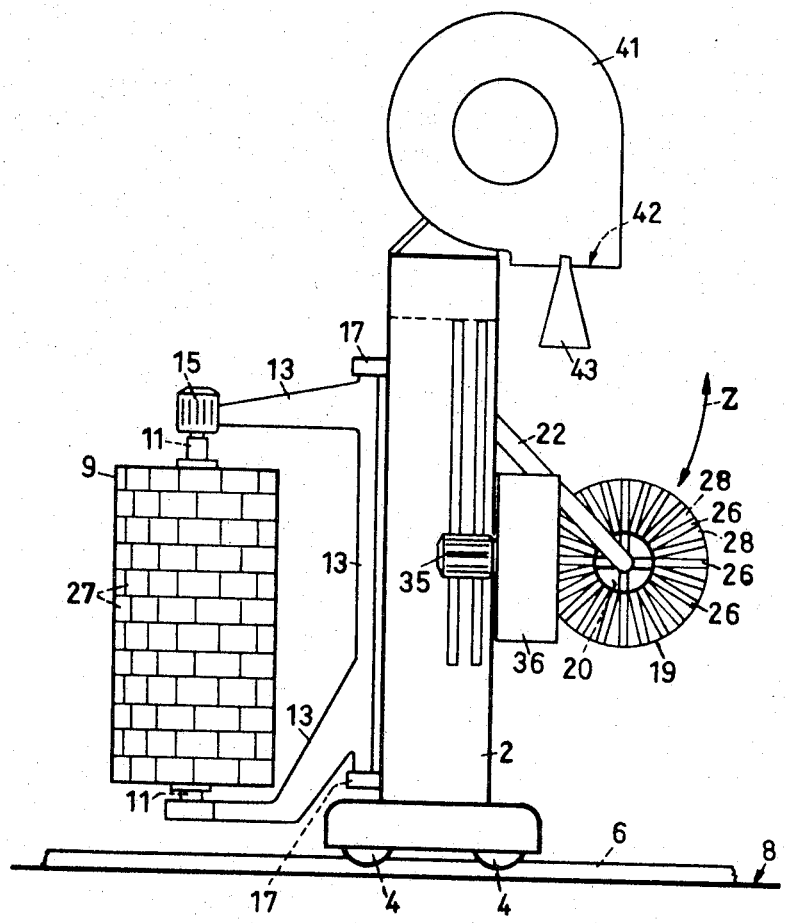
FIGURE 1 is a side elevation of the car cleaning plant according to the invention.
Figure 2:
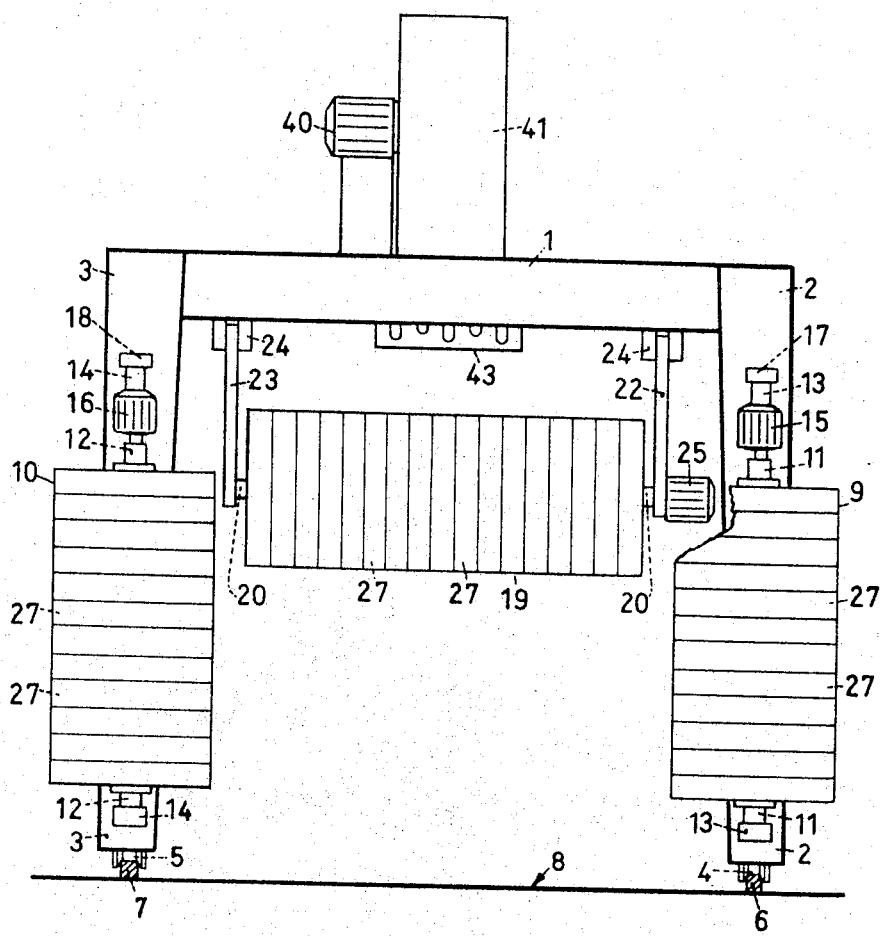
FIGURE 2 is a view of the cleaning plant shown in FIGURE 1 looking at it from the left.

The car-cleaning plant illustrated in FIGURES 1 to 7 is capable of cleaning and polishing motor cars automatically extremely carefully and economically. It comprises a spraying apparatus (not shown) by which the motor car to be cleaned is sprayed with a cleansing liquid to which a liquid detergent is added for the soaking and washing of the motor car to be cleaned, and by which the motor car is sprayed with cleansing liquid to which a liquid lacquer-perserving agent is added for the clearwashing of the motor car. The car-cleaning plant comprises, moreover a portal-shaped frame 1–5 on which a washing-and-polishing apparatus 9–28 for the washing and polishing of motor cars is mounted; a turbulence producer 29–47 for drying the motor cars after the clearwashing operation, and an electric control device (not shown) by which the devices referred to may be started and stopped.

The spraying apparatus (not shown) is provided with spray nozzles for spraying the motor car to be cleaned with a cleansing liquid with the addition of a liquid detergent for preliminary soaking and for washing the car to be cleaned, and for spraying the motor car upon clearwashing with a cleansing liquid to which a lacquer regenerating agent and lacquer-preserving agent are added. Depending upon the particular purpose for which it is provided, the spraying apparatus contains at least two proportioning or dispensing devices, one being provided for admixing an adjustable quantity of liquid detergent to the cleansing liquid used, the other being provided for admixing a liquid lacquer regenerating agent and lacquer preserving agent to the cleansing liquid for example clean water.

The portal-shaped frame 1–5 of the car-cleaning plant is of a movable construction, and comprises at its upper end a cross-beam 1, and, secured to the cross-beam 1, two legs 2 and 3. Secured to the lower ends of the legs 2 and 3 are rotatable rollers 4 and 5 which may be driven by electric means, and by which the frame 1–5 travels on two parallel rails 6 and 7 which are secured to the floor 8 of the car-washing room.

The washing and polishing apparatus 9–28 comprises two vertical cleaning rolls 9 and 10 (FIGURES 1–3), the cleaning rolls 9 and 10 being respectively rotatable by rotatable roller shafts 11 and 12 which are respectively mounted on bifurcated bearing frames 13 and 14 and rotated respectively by electric motors 15 and 16 secured respectively to the bearing frames 13 and 14.

Figure 3:
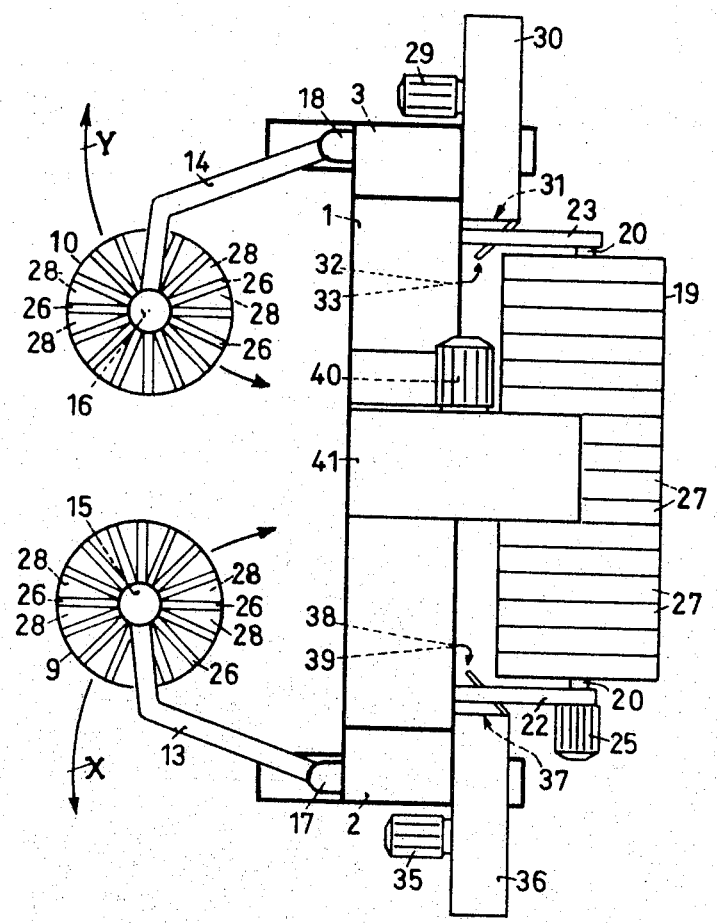
FIGURE 3 is a plan view of the car-cleaning plant illustrated in FIGURES 1 and 2.
Figure 4:
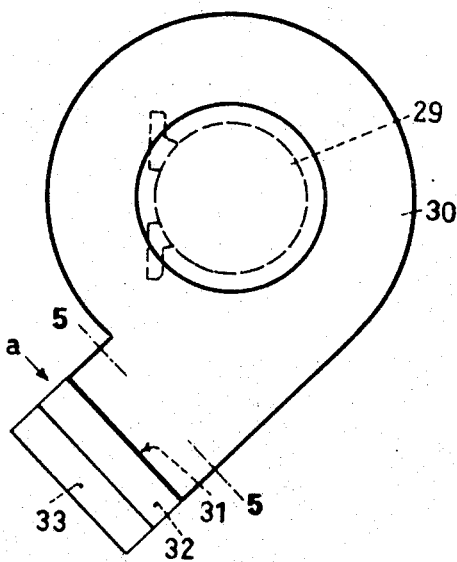
FIGURE 4 is a front elevation of a turbulence producer in which a lateral whirlwind or cyclone is produced.
Figure 5:
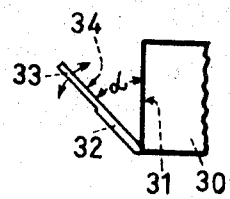
FIGURE 5 shows a fractional part of the turbulence producer illustrated in FIGURE 4 along the line 5—5 in FIGURE 4 viewed in the direction of the arrow $a$.

The bearing frames 13 and 14 are respectively provided with straight or angular supporting arms (FIGURES 1, 3) the ends of which carry the bearings in which the cleaning rolls 9 and 10 are mounted. The bearing frame 13 carrying the vertical cleaning roll 9 is mounted by journals provided thereon in two journal bearings 17 (FIGURES 1, 2), so as to pivot horizontally in the direction of the arrow X, and, in known manner, can press the rotatable vertical cleaning roll 9 mounted thereon, with the aid of an electric control device (not shown) resiliently against one side face of the motor car to be cleaned for washing and polishing the motor car and while the frame 1–5 travels simultaneously on the rails 6 and 7. The construction of the bearing frame 14 carrying the vertical cleaning roll 10 corresponds substantially to that of the bearing frame 13, except that it is mounted in a journal bearing 18 provided on the leg 3 so as to pivot horizontally in the direction of the arrow Y (FIGURE 3). The bearing frame 14 can press the cleaning roller 10 mounted thereon automatically against the other side face of the motor car to be cleaned, and may remove it therefrom, in similar manner as in the case of the bearing frame 13 and the cleaning roll 9. In addition, the washing and polishing apparatus 9–28 is provided with a horizontal rotatable cleaning roll 19 which, with its roller shaft 20, is mounted on two guide arms 22, 23 which are pivotable in the direction of the arrow Z in bearings 24 secured to the crossbeam 1, and which carry an electric motor 25 by which the cleaning roll 19 is rotated. By virtue of being mounted on the guide arms 22, 23 the cleaning roll 19 is enabled to rotate and to roll along the surface of the motor car to be cleaned as the frame 1–5 travels along when the surface of the motor car to be cleaned is washed and polished.

For washing and polishing, the cleaning rolls 9, 10 and 19 are respectively provided with a plurality of flexible cleaning bands or flexible cleaning strips (FIGURES 1 and 3) made of an elastic, clinging cellular plastic material or polyurethane foam, which absorbs and gives off cleansing liquid which, in dependence upon the number of bands or strips provided, are distributed along the length of the roller shafts 11, 12 or 20 of the cleaning rolls 9, 10, or 19 and, mounted at intervals on the roller shaft, are secured to the roller shaft in such manner that the geometric longitudinal axis of the longitudinal parts, disposed close to the roller shaft 11, 12 or 20, but not secured to that roller shaft, is flexible in an imaginary transverse, or substantially transverse, cross-sectional plane intersecting with the roller shaft, and being, moreover, flexible in an imaginary longitudinal sectional plane extending parallel, or substantially parallel, to the roller shaft 11, 12 or 20. The individual cleaning bands or cleaning strips (26) (FIGURES 1 and 3) are constructed and positioned on the roller shaft 11, 12 or 20 in such manner that the geometric longitudinal axes of the individual cleaning band or cleaning strips 26 extend radially from the roller shaft to the periphery of the cleaning roll 9, 10 or 19, their ends terminating on the periphery of the cleaning roll. For the purpose of a particularly economical manufacture, all cleaning bands or cleaning strips 26 of the respective cleaning rolls 9, 10 and 19 (FIGURES 1, 2, 3) may be so constructed as to hang together at one end to form groups 27, and may be disposed on the roller shafts 11, 12 or 20 in such manner that each group 27 comprises a plurality of tongue-shaped cleaning bands or cleaning strips 26 the free ends of which terminate on the periphery of the cleaning rolls 9, 10, or 19. The cleaning bands or cleaning strips 26 in each group 27 are formed by a flat ring made of the same material as the material of which the cleaning bands or strips 26 are made, and are provided with clearances 28 so that one tongue-shaped cleaning band or cleaning strip 26 may project between respectively two clearances 28 in the direction of the periphery of the cleaning roll, their free ends terminating on that periphery as shown in FIGURES 1, 3.

The turbulence-producing apparatus 29–47 comprises a first turbulence-producer 29–34 which is mounted on the leg 3 of the frame so as to be vertically adjustable (FIGURES 1–3); a second turbulence-producer 35–39 mounted on the leg 2 of the frame so as to be vertically adjustable, and a third turbulence-producer 40–47 mounted on the crossbeam 1 of the frame 1–5. The turbulence-producer 29–34 mounted on the leg 2 of the frame blows the whirlwind produced by it against one side face of the motor car to be dried in such manner that the direction of flow of the whirlwind and the surface referred to form an acute angle; the turbulence-producer 35–39 provided on the leg 3 of the frame 1–5 blows the whirlwind produced by it against the other side face of the motor car in such manner that the direction of flow of the whirlwind and the surface referred to also form an acute angle. The turbulence-producer 40–47 provided on the crossbeam 1 blows its whirlwind downwardly against the top surface of the motor car to be dried. The turbulence-producers 29–34 and 35–39 are respectively provided with blowers 30 and 36 driven respectively by electric motors 29 and 35. Provided at the air outlet openings 31 and 37 of the blower housings are guide plates 32 and 38 made of a rigid material, such as sheet metal, and secured to the guide plates 32, 38 are tongue-shaped swinging members 33, 39 made of resilient material, such as an elastic synthetic resin, rubber, or thin spring steel plate, and having one free end, by which swinging members the whirlwind is produced. The guide plates 32 and 38 and the respective swinging members 33 and 39 are mounted on the housings of the blowers 30 and 36 respectively in such manner that their guide faces 34 (FIGURES 4, 5) form an acute angle with the cross-sectional area of aperture of the air outlets 31 and 37 respectively (FIGURES 3 and 5), the swinging members 33, 39 can vibrate freely, and the air blast thus whirled up to form a whirlwind is blown against the sides of the motor car to be dried. The turbulence-producer 40–47 (FIGURES 1–3; 6–7) mounted on the crossbeam 1 of the frame 1–5 (FIGURES 1–3, 6–7) is provided with a blower 41 which is driven by an electric motor 40. The respective blower housing has a horizontal air outlet opening 42 at its lower end, and, provided thereon, a guide member 43 with guide faces 44 and 45, and downwardly extending air ducts 46 and 47 (FIGURES 6–7) for producing the whirlwind. The guide member 43 is disposed on and secure to the blower housing 41 in such manner that each of its two guide faces 44 and 45 forms an acute angle with the cross-sectional area of aperture of the air outlet 42, and the air blast issuing from the air outlet opening 42 is whirled up to form a whirlwind which is blown vertically downwards against the top surfaces of the motor car which are disposed above the side faces of the motor car to be dried.

The electric control device (not shown) by which the spraying apparatus, the washing and polishing apparatus 9–28, and the turbulence producing apparatus 29–47 are started and stopped may be operated from a stationary or movable operator's seat or control pulpit. Its construction is known so that it need not be described in detail.

We claim:

In a car-cleaning plant for the automatic cleaning of motor cars including spraying means for spraying a motor car with cleansing liquid, washing and polishing means including at least one rotating cleaning roller, and air drying means for drying the cleaned motor car, the improvement therein comprising: said air drying means includes at least one blower means for creating a blast of air, means for producing turbulent air blasts and directing such air blasts at an acute angle against the surface of the motor car, said turbulence-producing means includes deflector means providing at least one deflecting surface positioned at an acute angle to the direction of flow of the air blast created by said blower means, said deflector means further including means for producing a whirling movement in said air blast, said means for producing said whirling movement in said air blast comprises a series of channel means formed in said deflecting surface, said channel means being shaped so as to create said whirling movement in said air blast.

References Cited

UNITED STATES PATENTS

| | | |
|---|---|---|
| 354,204 | 12/1886 | McLaughlin _____ 15—406 |
| 1,522,667 | 1/1925 | Barducci. |
| 2,179,976 | 11/1939 | Easley _____ 15—312 X |
| 2,287,768 | 6/1942 | Eckstein. |
| 2,637,873 | 5/1953 | Berezny _____ 15—53 X |
| 2,663,041 | 12/1953 | Rende. |
| 2,929,088 | 3/1960 | Wier _____ 15—230.16 |
| 3,067,444 | 12/1962 | Dickson et al. ___ 15—230.16 X |

FOREIGN PATENTS

| | | |
|---|---|---|
| 544,132 | 7/1957 | Canada. |
| 1,183,894 | 2/1959 | France. |
| 695,333 | 8/1953 | Great Britain. |

ROBERT W. MICHELL, *Primary Examiner.*